US011632742B2

(12) United States Patent
Ko et al.

(10) Patent No.: US 11,632,742 B2
(45) Date of Patent: Apr. 18, 2023

(54) METHOD AND DEVICE FOR DETERMINING, WITH RESPECT TO PSFCH RESOURCE, TIME DOMAIN FOR PERFORMING SIDELINK COMMUNICATION IN NR V2X

(71) Applicant: LG Electronics Inc., Seoul (KR)

(72) Inventors: Woosuk Ko, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/592,703

(22) Filed: Feb. 4, 2022

(65) Prior Publication Data

US 2022/0159624 A1 May 19, 2022

Related U.S. Application Data

(63) Continuation of application No. PCT/KR2020/010908, filed on Aug. 14, 2020.
(Continued)

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0038* (2013.01); *H04L 1/08* (2013.01); *H04L 1/1812* (2013.01);
(Continued)

(58) Field of Classification Search
CPC ......... H04W 72/14; H04W 4/44; H04W 4/46; H04W 4/48
See application file for complete search history.

(56) References Cited

U.S. PATENT DOCUMENTS

2019/0327665 A1* 10/2019 Geng .................. H04W 72/005
2020/0029318 A1* 1/2020 Guo ...................... H04L 1/1819
(Continued)

FOREIGN PATENT DOCUMENTS

WO    WO2019151915    8/2019

OTHER PUBLICATIONS

ETRI, "Discussion on NR V2X Sidelink Retransmission," R1-1907037, 3GPP TSG RAN WG1 Meeting #97, Reno, USA, May 13-17, 2019, 7 pages.
(Continued)

*Primary Examiner* — Raj Jain
(74) *Attorney, Agent, or Firm* — Fish & Richardson P.C.

(57) ABSTRACT

Proposed is a method for a first device performing wireless communication. The method may comprise the steps of: determining a first time domain and a second time domain with respect to a physical sidelink feedback channel (PSFCH) resource; performing sidelink data transmission to a second device through a resource on the first time domain; receiving, from the second device, hybrid automatic repeat request (HARQ) feedback associated with the sidelink data transmission; and on the basis of the HARQ feedback, performing sidelink data retransmission to the second device through a resource on the second time domain. For example, the first time domain may precede the PSFCH resource. For example, the second time domain may follow the PSFCH resource.

14 Claims, 24 Drawing Sheets

Related U.S. Application Data

(60) Provisional application No. 62/887,532, filed on Aug. 15, 2019.

(51) Int. Cl.
| | | |
|---|---|---|
| *H04L 1/08* | (2006.01) | |
| *H04L 1/18* | (2006.01) | |
| *H04L 5/00* | (2006.01) | |
| *H04W 72/04* | (2009.01) | |
| *H04W 4/44* | (2018.01) | |
| *H04W 72/14* | (2009.01) | |
| *H04L 1/1812* | (2023.01) | |
| *H04W 72/0446* | (2023.01) | |

(52) U.S. Cl.
CPC .......... *H04L 5/0051* (2013.01); *H04L 5/0053* (2013.01); *H04W 4/44* (2018.02); *H04W 72/0406* (2013.01); *H04W 72/0446* (2013.01); *H04W 72/14* (2013.01)

(56) References Cited

U.S. PATENT DOCUMENTS

2020/0305176 A1* 9/2020 Hu .................. H04B 7/0456
2022/0060286 A1* 2/2022 Yoshioka .............. H04L 1/1864

OTHER PUBLICATIONS

InterDigital Inc., "On Physical Layer Procedures for NR V2X Sidelink," R1-195405, 3GPP TSG RAN WG1 #96bis, Xi'an, China, Apr. 8-12, 2019, 10 pages.

LG Electronics, "Discussion on Physical Layer Procedures for NR Sidelink," R1-1907018, 3GPP TSG RAN WG1 Meeting #97, Reno, USA, May 13-17, 2019, 13 pages.

NTT Docomo, Inc., "NR Sidelink Physical Layer Procedure," R1-1906209, 3GPP TSG RAN WG1 #97, Reno, USA, May 13-17, 2019, 14 pages.

* cited by examiner

FIG. 4
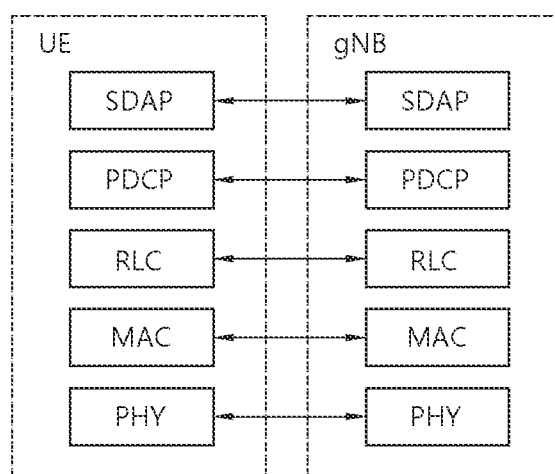
(a)
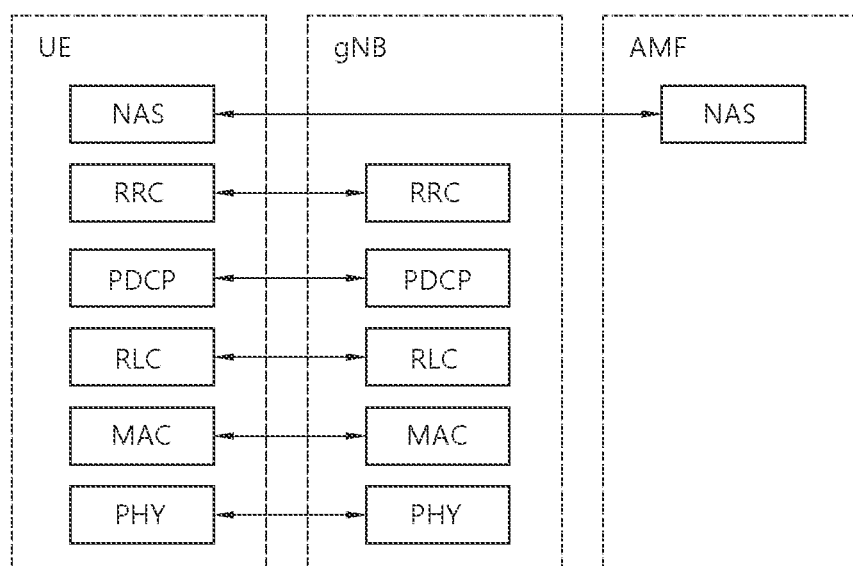
(b)

FIG. 8
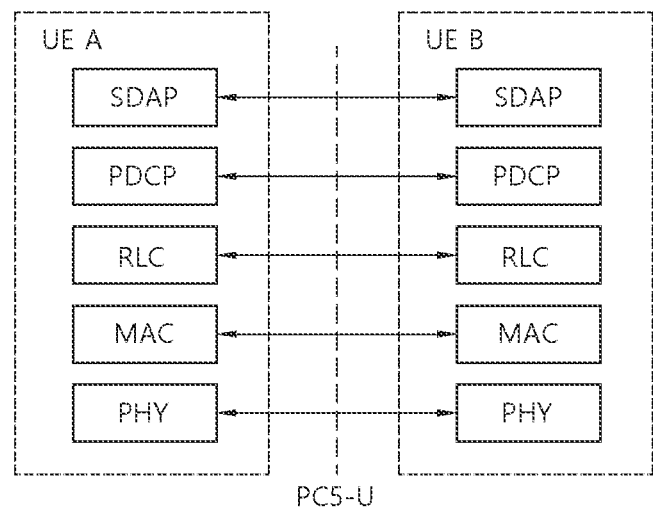
(a)
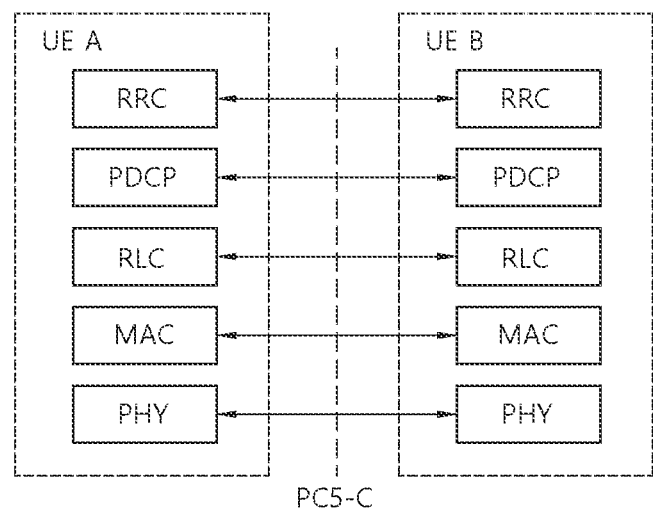
(b)

METHOD AND DEVICE FOR DETERMINING, WITH RESPECT TO PSFCH RESOURCE, TIME DOMAIN FOR PERFORMING SIDELINK COMMUNICATION IN NR V2X

CROSS-REFERENCE TO RELATED APPLICATIONS

Pursuant to 35 U.S.C. § 119(e), this application is a continuation of International Application PCT/KR2020/010908, with an international filing date of Aug. 14, 2020, which claims the benefit of U.S. Provisional Patent Application No. 62/887,532, filed on Aug. 15, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, when a transmitting UE allocates/determines/selects resources related to a transmission of sidelink information in a resource pool based on a sensing procedure, the transmitting UE may allocate/determine/select resources for receiving a HARQ feedback related to the transmission of sidelink information from the receiving UE. In the present disclosure, since the HARQ feedback related to the transmission of sidelink information is transmitted through a PSFCH, the HARQ feedback resources related to the transmission of sidelink information (e.g., resources for the transmitting UE to receive the HARQ feedback related to the transmission of sidelink information from the receiving UE or resources for the receiving UE to transmit the HARQ feedback related to the transmission of sidelink information to the transmitting UE) may be referred to as PSFCH resources.

Meanwhile, the transmitting UE may determine a selection window [n+T1, n+T2], which is a time interval for allocating/determining/selecting resources related to a transmission of sidelink information, based on service requirements (e.g., delay budget or latency requirement). For example, the selection window may include resources related to transmission of a first physical sidelink shared channel (PSSCH) and/or a first physical sidelink control channel (PSCCH), and the selection window may not include HARQ feedback resources (e.g., first PSFCH resources) related to the first PSSCH and/or the first PSCCH. In this case, since the selection window does not include the HARQ feedback resources (or the first PSFCH resources) related to the first PSSCH and/or the first PSCCH, the transmitting UE may be unable to receive HARQ feedback information related to transmission of the first PSSCH and/or the first PSCCH from the receiving UE.

Technical Solutions

According to an embodiment of the present disclosure, there is provided a method of performing wireless communication by a first device. The method may include determining a first time domain and a second time domain based on physical sidelink feedback channel (PSFCH) resources, performing, to a second device, transmission for sidelink data through resources on the first time domain, receiving, from the second device, a hybrid automatic repeat request (HARQ) feedback related to the transmission for the sidelink data, and performing, to the second device, retransmission of the sidelink data based on the HARQ feedback through resources on the second time domain. For example, the first time domain precedes the PSFCH resources. For example, the second time domain follows the PSFCH resources.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
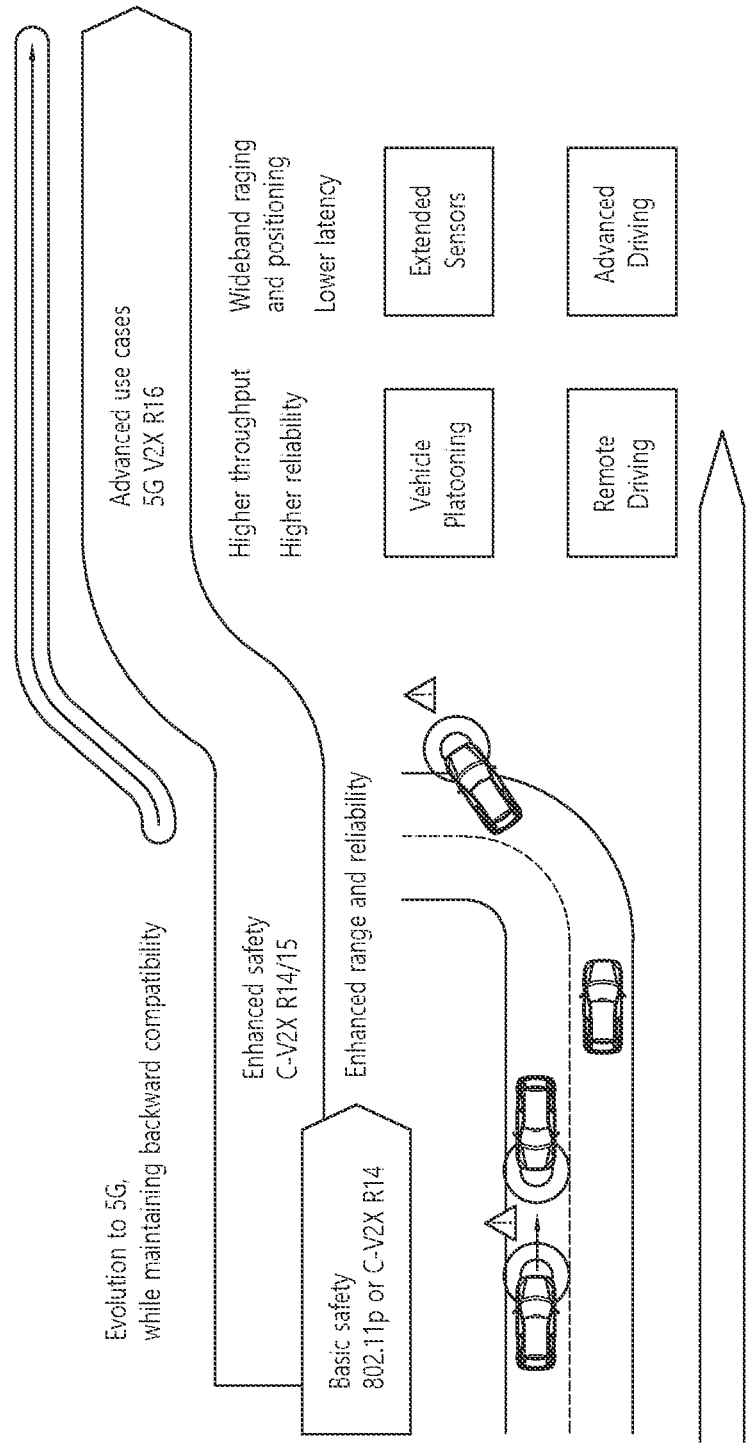
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
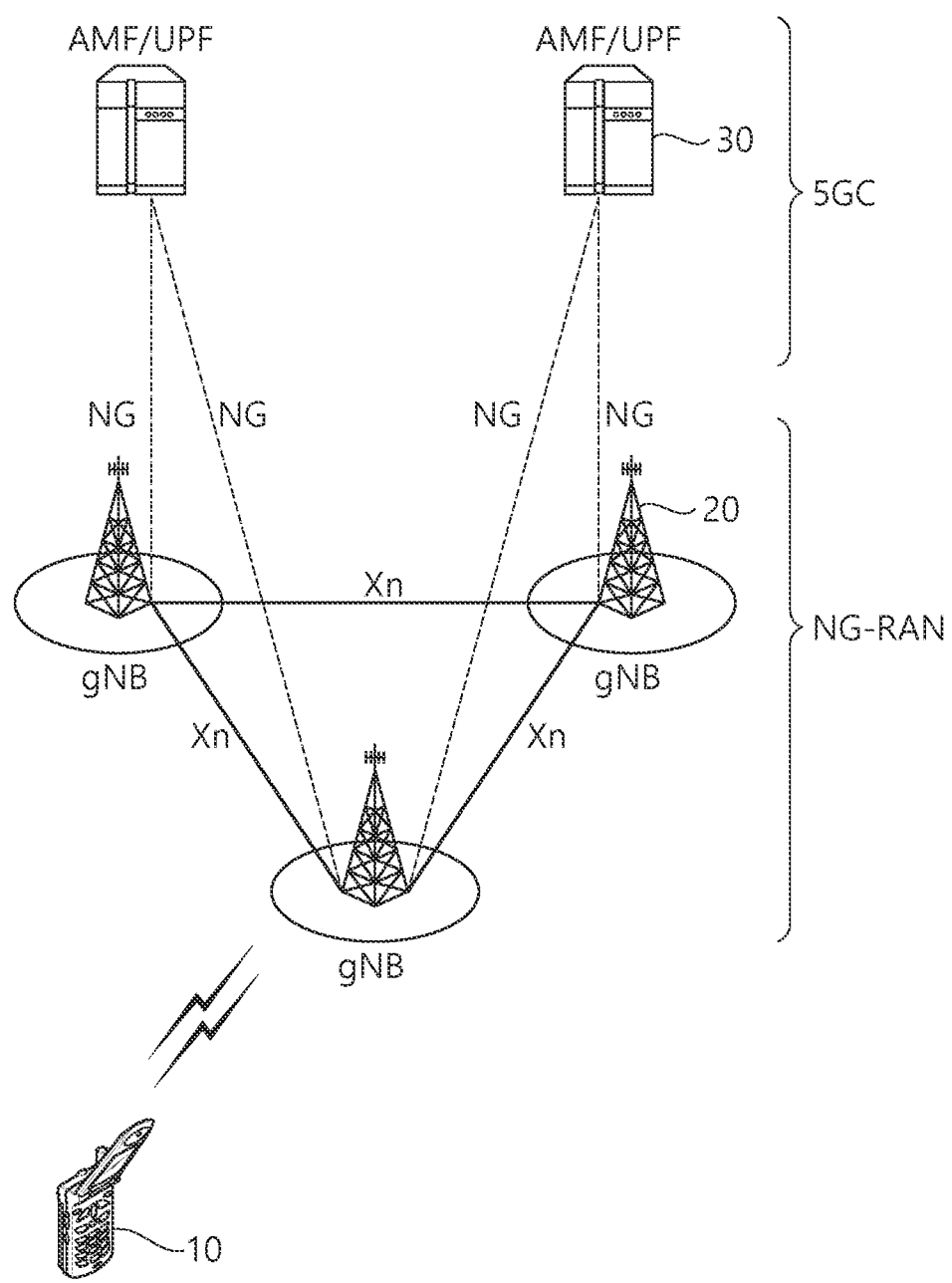
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
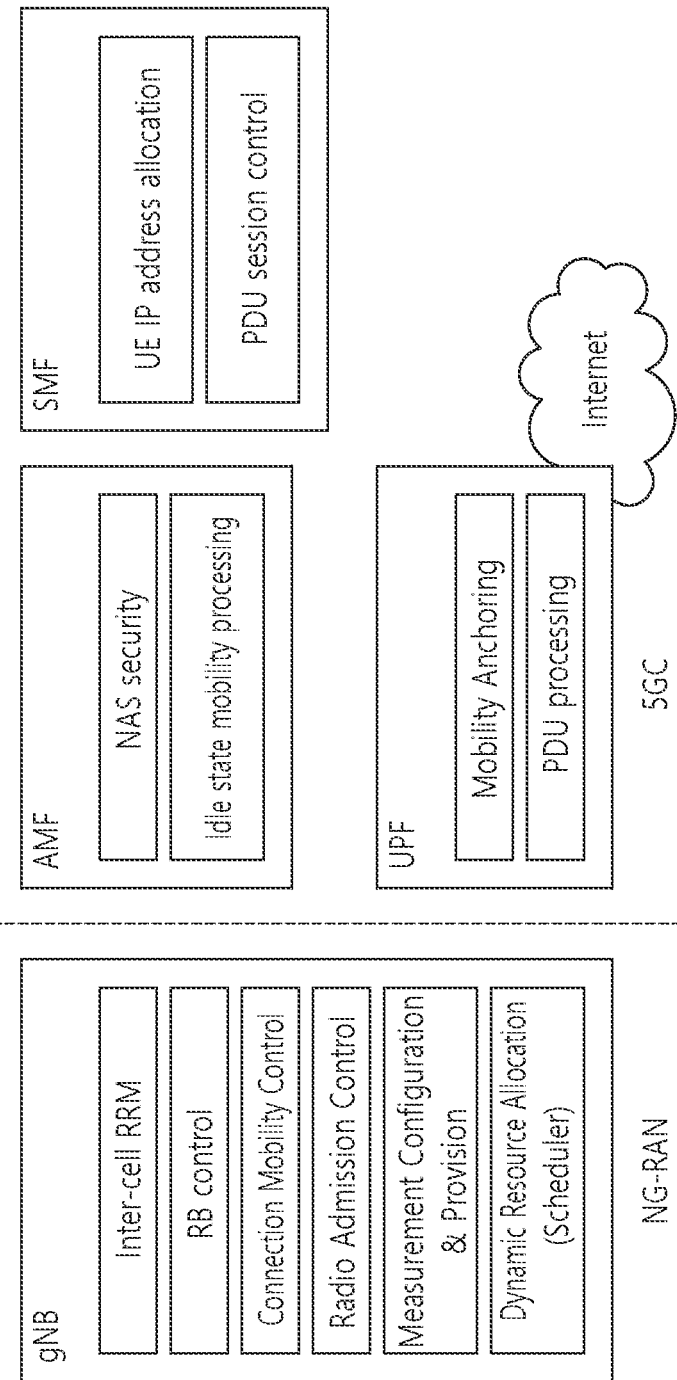
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
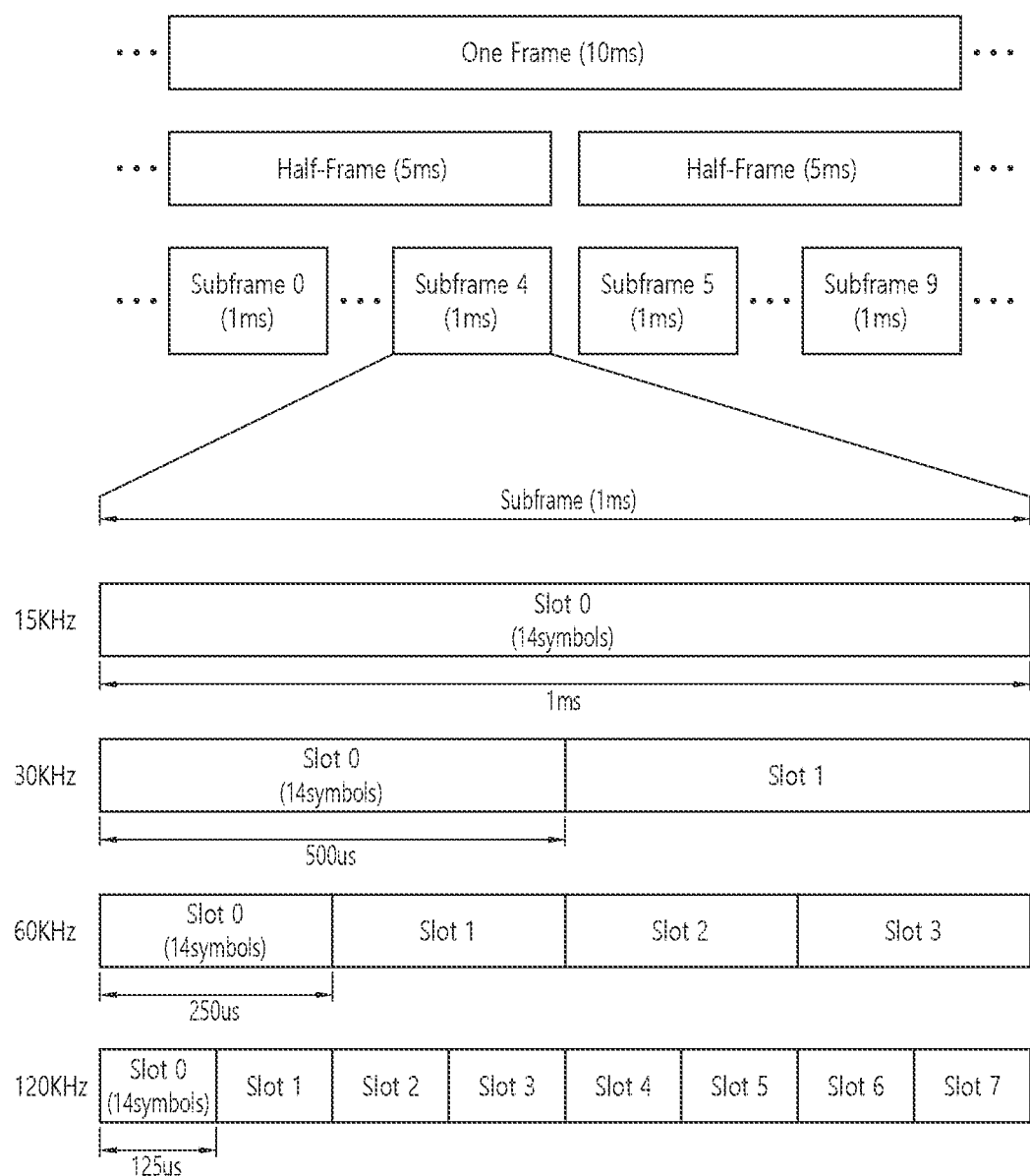
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
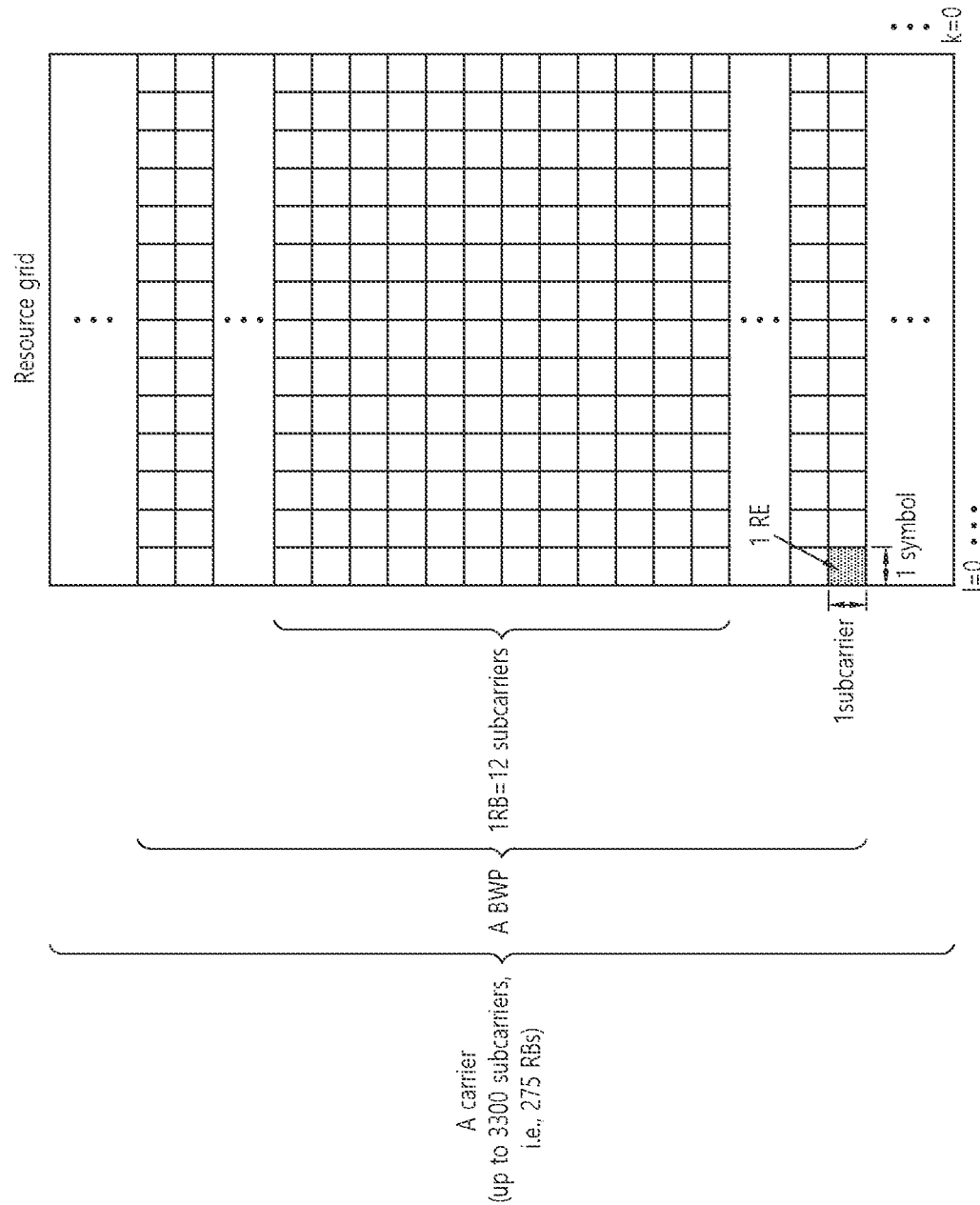
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
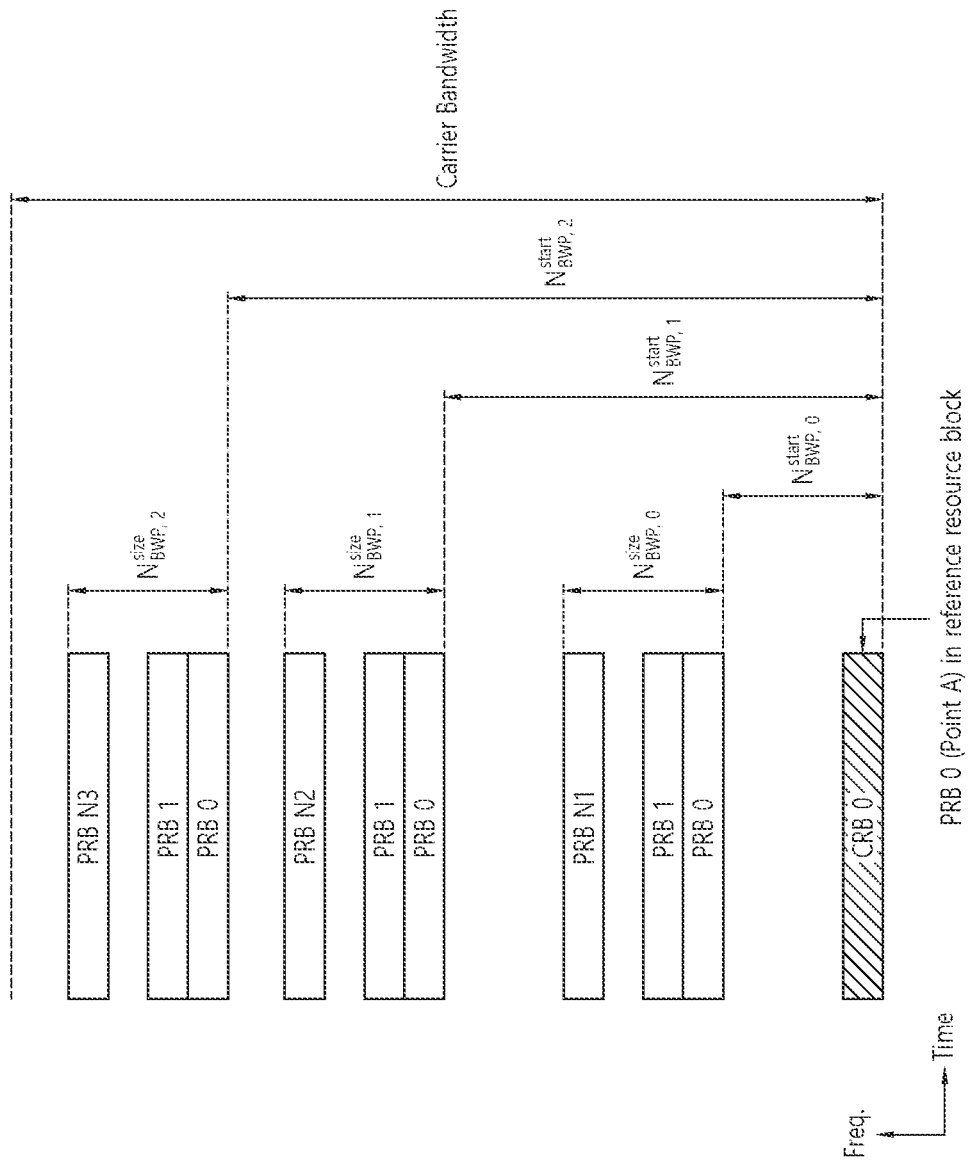
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
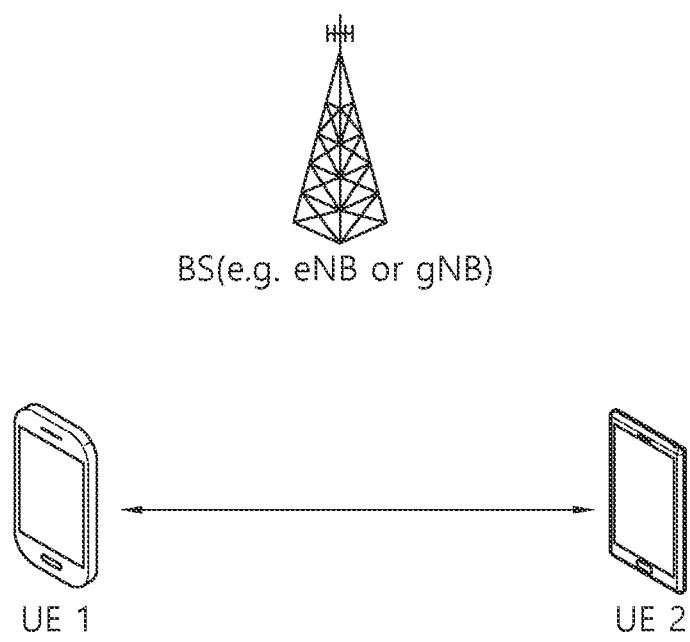
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
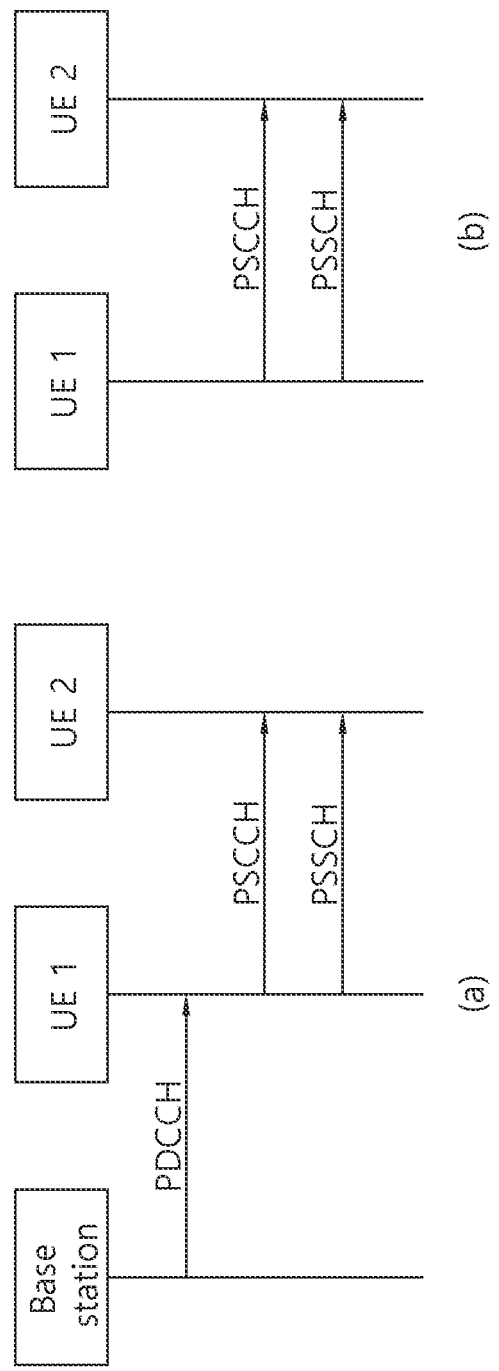
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
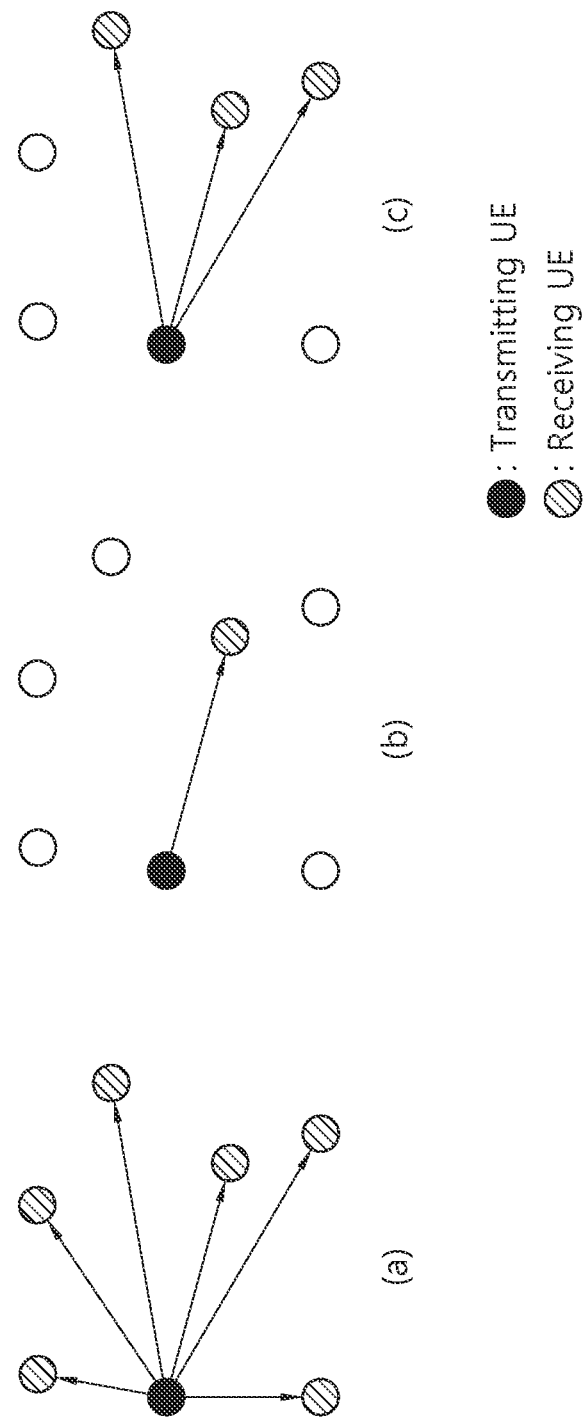
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, when a transmitting UE allocates/determines/selects resources related to a transmission of sidelink information in a resource pool based on a sensing procedure, the transmitting UE may allocate/determine/select resources for receiving a HARQ feedback related to the transmission of sidelink information from the receiving UE. In the present disclosure, since the HARQ feedback related to the transmission of sidelink information is transmitted through a PSFCH, the HARQ feedback resources related to the transmission of sidelink information (e.g., resources for the transmitting UE to receive the HARQ feedback related to the transmission of sidelink information from the receiving UE or resources for the receiving UE to transmit the HARQ feedback related to the transmission of sidelink information to the transmitting UE) may be referred to as PSFCH resources. In the present disclosure, the sidelink information may include at least one of sidelink data, sidelink control information, a sidelink service, and/or a sidelink packet.

Meanwhile, the transmitting UE may determine a selection window [n+T1, n+T2], which is a time interval for allocating/determining/selecting resources related to a transmission of sidelink information, based on service requirements (e.g., delay budget or latency requirement). For example, the transmitting UE may determine the selection window by selecting the T1 value and the T2 value in order to satisfy service requirements (e.g., a delay budget or latency requirement). For example, the value n may be a value indicating a time point at which the transmitting UE is requested to allocate/determine/select resources related to the transmission of sidelink information by a higher layer. For example, the selection window may include one or more slots or one or more subframes. For example, the delay requirement may be a value determined by the service requirements. For example, the delay requirement may be related to a time until the transmitting UE transmits sidelink information to the receiving UE and completes confirmation of the transmission of the sidelink information. For example, the delay requirement may be related to a time until the transmitting UE completes receiving a HARQ feedback for the transmission of sidelink information from the receiving UE. That is, based on a time until the transmitting UE completes receiving a HARQ feedback for a transmission of sidelink information from the receiving UE, the transmitting UE may determine a selection window [n+T1, n+T2] that is a time interval for allocating/determining/selecting resources related to the transmission of the sidelink information. For example, the transmitting UE may determine the selection window by selecting the T1 values and the T2 values to satisfy the time until the transmitting UE completes receiving the HARQ feedback for the transmission of the sidelink information from the receiving UE. For example, the value n may be a value indicating a time point at which the transmitting UE is requested to allocate/determine/select resources related to the transmission of the sidelink information by a higher layer. In addition, the sidelink information may be transmitted or received by a UE through a PSSCH and/or PSCCH.

Meanwhile, for example, the selection window may include resources related to a first PSSCH and/or a first PSCCH transmission, HARQ feedback resources (e.g., first PSFCH resources) related to the first PSSCH and/or the first PSCCH, and resources related to a second PSSCH and/or a second PSCCH transmission. Herein, the resources related to the first PSSCH and/or the first PSCCH transmission may precede the HARQ feedback resources (e.g., the first PSFCH resources) related to the first PSSCH and/or the first PSCCH in a time domain, and the resources related to the second PSSCH and/or the second PSCCH transmission may follow the HARQ feedback resources (e.g., the first PSFCH resources) related to the first PSSCH and/or the first PSCCH in the time domain. In this case, since the selection window includes the HARQ feedback resources (e.g., the first PSFCH resources) related to the first PSSCH and/or the first PSCCH, the transmitting UE may receive a HARQ feedback related to the transmission of the first PSSCH and/or the first PSCCH from the receiving UE.

On the other hand, for example, the selection window may include the resources related to the first PSSCH and/or the first PSCCH transmission, may not include the HARQ feedback resources (e.g., the first PSFCH resources) related to the first PSSCH and/or the first PSCCH. In this case, since the selection window does not include the HARQ feedback resources (or the first PSFCH resources) related to the first PSSCH and/or the first PSCCH, the transmitting UE may be unable to receive HARQ feedback information related to the transmission of the first PSSCH and/or the first PSCCH from the receiving UE.

Therefore, as described above, in a case of NR sidelink mode 2 operation in which the transmitting UE allocates resources related to a transmission of sidelink information, or in a case of LTE sidelink mode 2 or mode 4 operation, in order to support efficient sidelink transmission or retransmission of the transmitting UE, a method for the transmitting UE to transmit the sidelink information to the receiving UE needs to be proposed, based on whether HARQ feedback resources (e.g., PSFCH resources) related to the transmission of the sidelink information is included in the selection window determined by the transmitting UE. In addition, for example, according to a relative position in a time domain of the HARQ feedback resources (e.g., PSFCH resources) related to the transmission of the sidelink information included in the selection window, a method for the transmitting UE to transmit the sidelink information to the receiving UE needs to be specifically proposed. Hereinafter, according to an embodiment of the present disclosure, based on whether HARQ feedback resources (e.g., PSFCH resources) related to a transmission of sidelink information is included in a selection window and/or a relative position in a time domain of HARQ feedback resources (e.g., PSFCH resources) related to a transmission of sidelink information included in a selection window, a method for a transmitting UE to transmit sidelink information to a receiving UE and an apparatus supporting the same will be described in detail.

Figure 12:
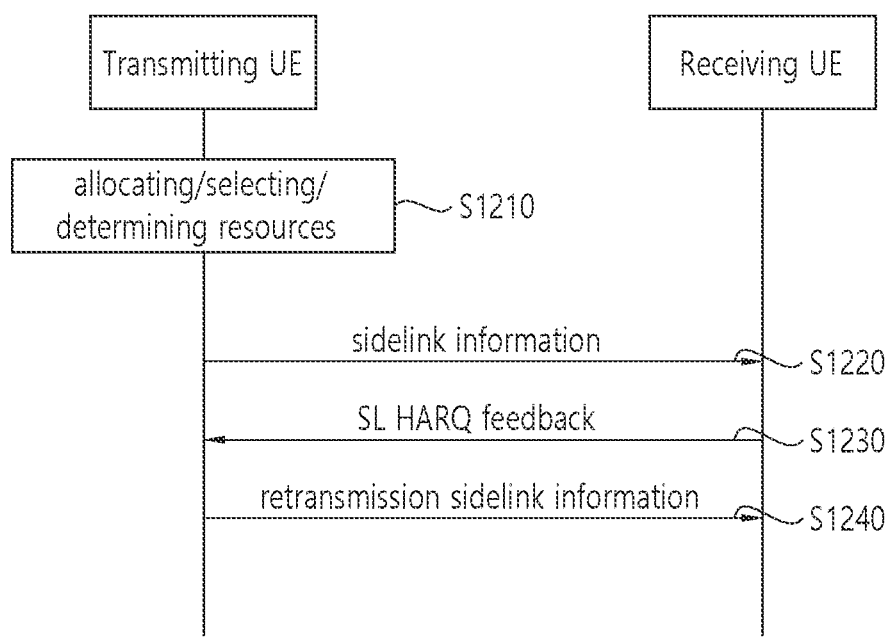
FIG. 12 shows a procedure for performing a retransmission based on an initial transmission, a blind retransmission, and/or a HARQ feedback related to a transmission of sidelink information, by a transmitting UE using resources included in a selection window, in accordance with an embodiment of the present disclosure.

FIG. 12 shows a procedure for performing a retransmission based on an initial transmission, a blind retransmission, and/or a HARQ feedback (hereinafter, referred to as a SL HARQ feedback) related to a transmission of sidelink information, by a transmitting UE using resources included in a selection window, in accordance with an embodiment of the present disclosure. The embodiment of FIG. 12 may be combined with various embodiments of the present disclosure.

In the embodiment of FIG. 12, it is assumed that HARQ feedback resources (e.g., PSFCH resources) related to a transmission of sidelink information is located within a selection window.

Referring to FIG. 12, in step S1210, the transmitting UE may select or determine a selection window [n+T1, n+T2] that is a time interval for allocating/selecting/determining resources related to a transmission of sidelink information. For example, the selection window may be selected or determined based on service requirements (e.g., a delay budget or latency requirement) related to the sidelink information. For example, the transmitting UE may determine the selection window by selecting the T1 value and the T2 value in order to satisfy service requirements (e.g., a delay budget or latency requirement). For example, the value n may be a value indicating a time point at which the transmitting UE is requested to allocate/determine/select resources related to the transmission of the sidelink information by a higher layer. For example, the selection window may include a specific time area. For example, the selection window may include one or more slots or one or more subframes. For example, the transmitting UE may allocate/select/determine the resources related to the transmission of the sidelink information within the selection window based on a sensing procedure. For example, the resources related to the transmission of the sidelink information may be allocated/selected/determined within a resource pool. For example, the resources related to the transmission of the sidelink information may be at least one of resources for the transmitting UE to transmit the sidelink information to the receiving UE and/or resources for receiving a HARQ feedback related to the transmission of the sidelink information from the receiving UE. In the present disclosure, for convenience of description, the resources for the transmitting UE to transmit the sidelink information may be referred to as sidelink transmission resources. For example, the sidelink transmission resources may be resources related to transmissions of one or more PSSCHs and/or one or more PSCCHs. In the present disclosure, for convenience of description, resources related to the PSSCH transmission may be referred to as PSSCH resources, resources related to the PSCCH transmission may be referred to as PSCCH resources, and resources related to a transmission and reception of a HARQ feedback related to the transmission of the sidelink information may be referred to as PSFCH resources. In addition, the transmitting UE may be configured or pre-configured information for a time interval or information for a time offset related to PSFCH resources through a MAC CE (control element) and/or RRC signaling from a base station. For example, the transmitting UE may determine the PSFCH resources based on information for a time interval or information for a time offset related to the PSFCH resources through a MAC CE (control element) and/or RRC signaling. For example, the transmitting UE may allocate/select/determine the closest resources in a time domain following by a time offset or time interval from the PSSCH resources through a MAC CE and/or RRC signaling as the PSFCH resources. For example, the transmitting UE may allocate/select/determine the closest resources in a time domain preceding by a time offset or time interval from the PSSCH resources through a MAC CE and/or RRC signaling as the PSFCH resources.

For example, based on service requirements related to sidelink information (e.g., a delay budget or a latency requirement), the transmitting UE may select or determine a selection window that is a time interval for allocating/selecting/determining resources related to a transmission of the sidelink information. And, for example, by using the resources related to the transmission of the allocated/selected/determined sidelink information within the selected or determined selection window, the transmitting UE may perform an initial transmission, a blind retransmission, and/or a retransmission based on a SL HARQ feedback. In the present disclosure, the blind retransmission may mean that the transmitting UE performs a retransmission without a feedback from the receiving UE or regardless of the feedback received from the receiving UE. In the present disclosure, the retransmission based on the SL HARQ feedback may mean that the transmitting UE performs a retransmission based on a SL HARQ feedback (e.g., a HARQ NACK) received from the receiving UE. For example, when one or more PSCCH resources and/or one or more PSSCH resources included in the selection window precede PSFCH resources in a time domain, the transmitting UE may determine each of the one or more PSCCH resources and/or one or more PSSCH resources as resources for performing an initial transmission and/or resources for performing a blind retransmission. For example, when one or more PSCCH resources and/or one or more PSSCH resources included in the selection window follow PSFCH resources in a time domain, the transmitting UE may determine each of the one or more PSCCH resources and/or one or more PSSCH resources as resources for performing a SL HARQ feedback-based retransmission.

In step S1220, the transmitting UE may transmit the sidelink information to the receiving UE. For example, the transmitting UE may transmit the sidelink information to the receiving UE by using PSSCH resources and/or PSCCH resources preceding PSFCH resources included in the selection window in a time domain. For example, the transmission of the sidelink information may be an initial transmission. For example, the transmission of the sidelink information may be an initial transmission and a blind retransmission.

In step S1230, the transmitting UE may receive a SL HARQ feedback related to the transmission of the sidelink information from the receiving UE. For example, the SL HARQ feedback related to the transmission of the sidelink information may be received through the PSFCH.

In step S1240, the transmitting UE may retransmit the sidelink information to the receiving UE. For example, the transmitting UE may perform a SL HARQ feedback-based retransmission. For example, when the transmitting UE receives a SL HARQ NACK from the receiving UE in step S1230, the transmitting UE may retransmit the sidelink information to the receiving UE by using PSSCH resources and/or PSCCH resources that follows the PSFCH resources included in the selection window in step S1240 in the time domain.

Figure 13:
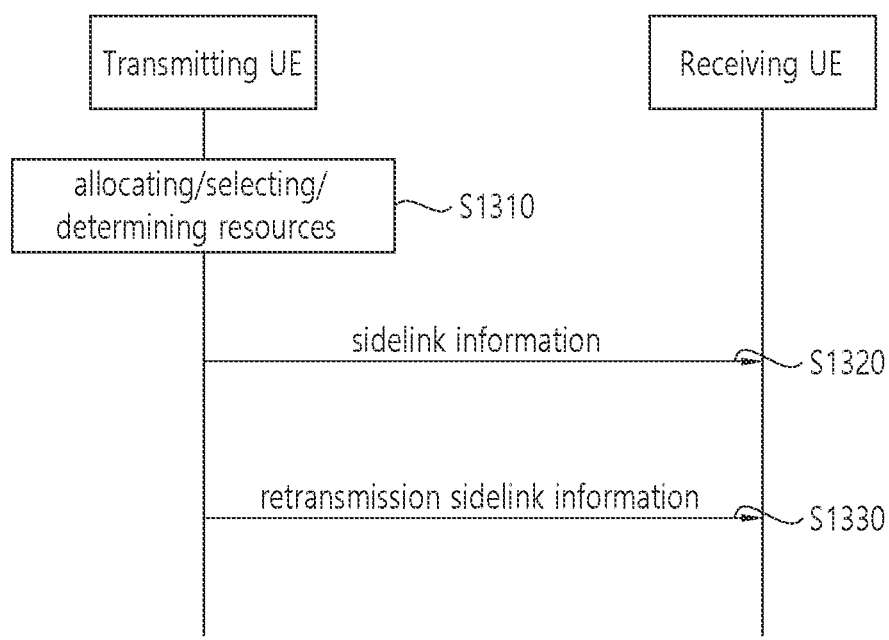
FIG. 13 shows a procedure for performing an initial transmission and/or a blind retransmission by a transmitting UE using resources included in a selection window, in accordance with an embodiment of the present disclosure.

FIG. 13 shows a procedure for performing an initial transmission and/or a blind retransmission by a transmitting UE using resources included in a selection window, in accordance with an embodiment of the present disclosure. The embodiment of FIG. 13 may be combined with various embodiments of the present disclosure.

In the embodiment of FIG. 13, it is assumed that PSFCH resources are not included in a selection window.

Referring to FIG. 13, in step S1310, the transmitting UE may select or determine a selection window [n+T1, n+T2] that is a time interval for allocating/selecting/determining resources related to a transmission of sidelink information. For example, the selection window may be selected or determined based on service requirements (e.g., a delay budget or latency requirement) related to the sidelink information. For example, the transmitting UE may determine the selection window by selecting the T1 value and the T2 value in order to satisfy service requirements (e.g., a delay budget or latency requirement). For example, the value n may be a value indicating a time point at which the transmitting UE is requested to allocate/determine/select resources related to the transmission of the sidelink information by a higher layer. For example, the selection window may include a specific time area. For example, the selection window may include one or more slots or one or more subframes. For example, the transmitting UE may allocate/select/determine the resources related to the transmission of the sidelink information within the selection window based on a sensing procedure. For example, the resources related to the transmission of the sidelink information may be allocated/selected/determined within a resource pool. Since step S1310 is the same as step S1210, details described in step S1210 may be referred to.

In steps S1320 to S1330, the transmitting UE may perform an initial transmission and/or a blind retransmission by using the resources related to the transmission of the allocated/selected/determined sidelink information within the selected or determined selection window. In the embodiment of FIG. 13, since the PSFCH resources are not included in the selection window, the transmitting UE may not perform a SL HARQ feedback-based retransmission.

Figure 14:
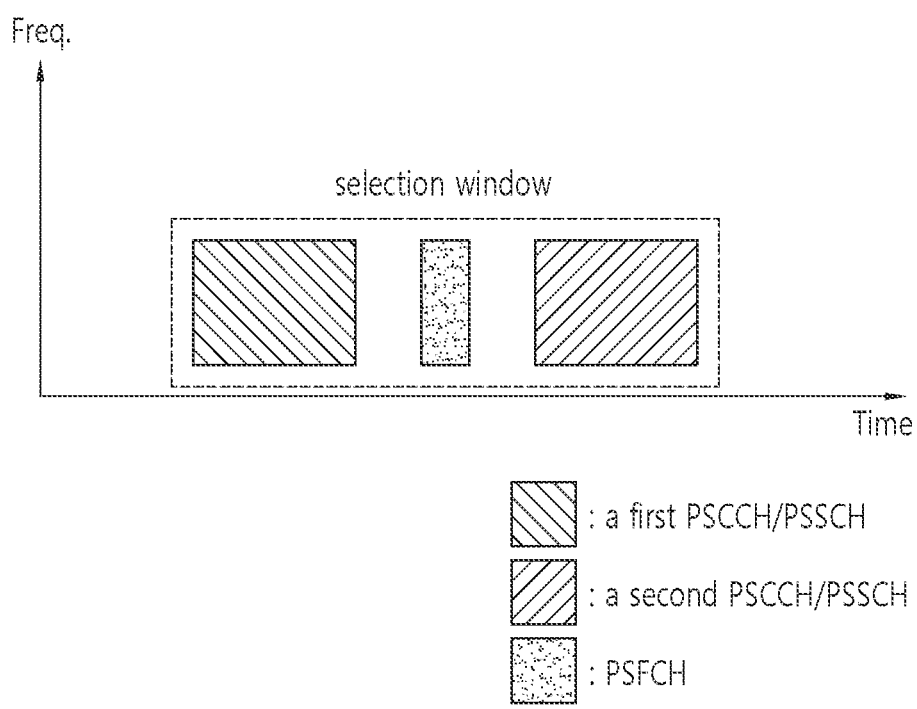
FIG. 14 shows an example of resources allocated/selected/determined by a transmitting UE within a selection window, in accordance with an embodiment of the present disclosure.
Figure 15:
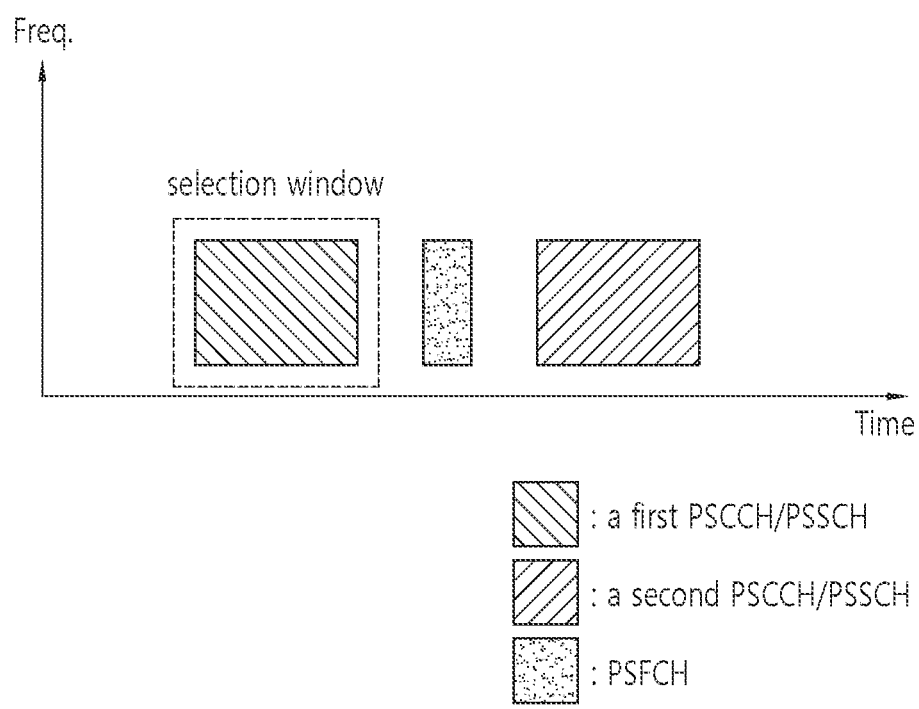
FIG. 15 shows another example of resources allocated/selected/determined by a transmitting UE within a selection window, in accordance with an embodiment of the present disclosure.

FIG. 14 shows an example of resources allocated/selected/determined by a transmitting UE within a selection window, in accordance with an embodiment of the present disclosure. FIG. 15 shows another example of resources allocated/selected/determined by a transmitting UE within a selection window, in accordance with an embodiment of the present disclosure.

Hereinafter, with reference to the embodiments of FIGS. 14 and 15, a method in which the transmitting UE uses the allocated/selected/determined resources within the selection window will be described in detail.

In the embodiments of FIGS. 14 and 15, it is assumed that first PSCCH resources and/or first PSSCH resources, PSFCH resources, second PSCCH resources and/or second PSSCH resources are allocated to the transmitting UE. However, the present disclosure is not limited thereto, and the number of PSCCH resources and/or PSSCH resources or the number of PSFCH resources may be variously allocated. In addition, in the embodiments of FIGS. 14 and 15, it is assumed that the PSFCH is related to the first PSCCH and/or the first PSSCH. However, the present disclosure is not limited thereto, and one PSFCH may be related to one or more PSCCHs and/or one or more PSSCHs.

Referring to FIG. 14, a selection window selected or determined by the transmitting UE may include first PSCCH resources and/or first PSSCH resources, PSFCH resources, second PSCCH resources, and/or second PSSCH resources. In this case, the transmitting UE may use the first PSCCH and/or the first PSSCH resources preceding the PSFCH resources included in the selection window in a time domain as initial transmission resources and/or blind retransmission resources. For example, the transmitting UE may perform an initial transmission and/or a blind retransmission by using the first PSCCH and/or the first PSSCH resources. For example, the transmitting UE may use the second PSCCH and/or the second PSSCH resources that follows the PSFCH resources included in the selection window in a time domain as SL HARQ feedback-based retransmission resources. For example, the transmitting UE may perform a SL HARQ feedback-based retransmission by using the second PSCCH and/or the second PSSCH resources.

In an embodiment, the transmitting UE may receive at least one SL HARQ feedback related to the first PSCCH and/or the first PSSCH transmission from the receiving UE by using the PSFCH resources. In this case, the at least one SL HARQ feedback may include HARQ ACK or HARQ NACK. For example, when the transmitting UE receives a HARQ ACK from the receiving UE, the transmitting UE may not perform a SL HARQ feedback-based retransmission through the second PSCCH and/or the second PSSCH resources that follows the PSFCH resources included in the selection window in a time domain. For example, when the transmitting UE receives a HARQ ACK from the receiving UE, the transmitting UE may release the second PSCCH and/or the second PSSCH resources that follows the PSFCH resources included in the selection window in a time domain. For example, when the transmitting UE receives a HARQ NACK from the receiving UE, the transmitting UE may perform a SL HARQ feedback-based retransmission by using the second PSCCH and/or the second PSSCH resources that follows the PSFCH resources included in the selection window in a time domain.

In an embodiment, based on a level of interference and/or noise for resources related to a transmission of sidelink information preceding and/or following in a time domain than the PSFCH resources, the transmitting UE may determine a use of the allocated resources within the selection window. For example, when the level of interference and/or noise for the resources related to the transmission of the sidelink information preceding and/or following the PSFCH resources in a time domain is higher than a specific value or a threshold value, the transmitting UE may determine the use of resources allocated within the selection window based on service priority, QoS, and/or cast type (e.g., unicast, groupcast, or broadcast). For example, when a high reliability is required based on service priority, QoS and/or cast type (e.g., unicast, groupcast or broadcast) for sidelink information that the transmitting UE wants to transmit to the receiving UE, the transmitting UE may use all resources included in the selection window for an initial transmission and/or a SL HARQ feedback-based retransmission. For example, when a low latency is required based on service priority, QoS and/or cast type (e.g., unicast, groupcast or broadcast) for sidelink information that the transmitting UE wants to transmit to the receiving UE, the transmitting UE may perform an initial transmission and/or a blind retransmission by using all resources included in the selection window.

In an embodiment, when the level of interference and/or noise for the resources related to the transmission of the sidelink information preceding and/or following the PSFCH resources in a time domain is higher than a specific value or a threshold value, the transmitting UE may perform an initial transmission, a blind retransmission, and/or a SL HARQ feedback-based retransmission by using resources included in the selection window, based on received/configured or pre-configured information through MAC CE and/or RRC signaling.

In an embodiment, the transmitting UE may determine a use of the resources allocated within the selection window based on whether a SL HARQ feedback-based retransmission is required according to the cast type. For example, when a SL HARQ feedback-based retransmission is required, such as unicast or groupcast, the transmitting UE may perform the SL HARQ feedback-based retransmission by using the resources that follows the PSFCH resources included in the selection window in a time domain. For example, when a retransmission based on a HARQ feedback is not required, such as broadcast, the transmitting UE may perform an initial transmission and/or a blind retransmission by using all resources included in the selection window.

Referring to FIG. 15, the selection window selected or determined by the transmitting UE may include the first PSCCH resources and/or the first PSSCH resources, but may not include the PSFCH resources. In this case, for example, the transmitting UE may use all resources including the first PSCCH resources and/or the first PSSCH resources allocated within the selection window as resources for an initial transmission and/or resources for a blind retransmission. For example, the transmitting UE may perform an initial transmission and/or a blind retransmission using the PSSCH resources and/or the PSCCH resources included in the selection window.

Figure 16:
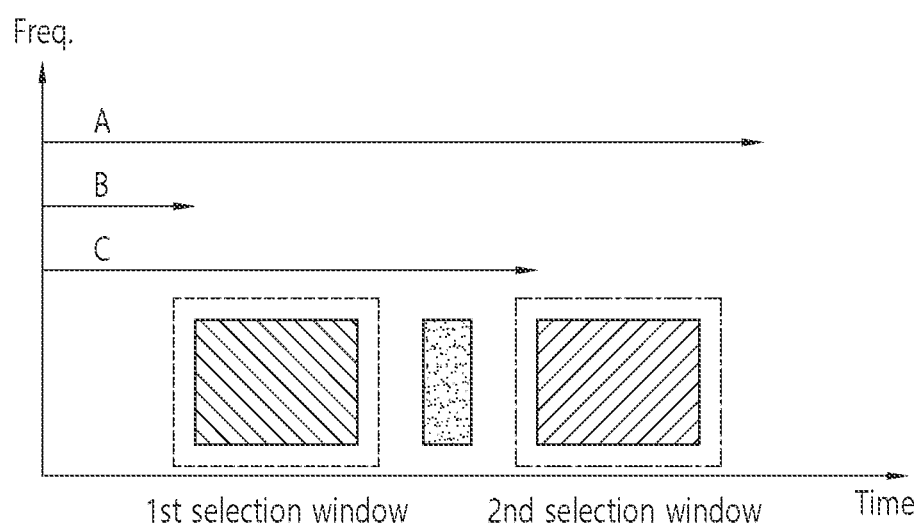
FIG. 16 shows a plurality of selection windows determined by a transmitting UE in a range that satisfies a delay requirement, in accordance with an embodiment of the present disclosure.

FIG. 16 shows a plurality of selection windows determined by a transmitting UE in a range that satisfies a delay requirement, in accordance with an embodiment of the present disclosure. The embodiment of FIG. 16 may be combined with various embodiments of the present disclosure.

Referring to FIG. 16, the transmitting UE may select or determine one or more selection windows based on service requirements (e.g., a delay budget or a latency requirement) related to sidelink information. For example, the one or more selection windows may be one or more time intervals for allocating/selecting/determining resources related to transmission of sidelink information. Thereafter, for example, the transmitting UE may perform an initial transmission, a blind retransmission, and/or a SL HARQ feedback-based retransmission using resources related to the transmission of the sidelink information allocated within the one or more selection windows. For example, the transmitting UE may select or determine a first selection window [n+T1, n+T2] for allocating/selecting/determining resources related to the initial transmission and/or blind retransmission, and the transmitting UE may select or determine a second selection window [n+T3, n+T4] for allocating/selecting/determining resources related to the SL HARQ feedback-based retransmission. For example, by selecting the T1 value, T2 value, T3 value and T4 value to satisfy service requirements (e.g., a delay budget or a latency requirement), the transmitting UE may determine the first selection window and the second selection window. For example, the value n may be a value indicating a time point at which the transmitting UE is requested to allocate/select/determine resources related to the transmission of the sidelink information by a higher layer. For example, each of the one or more selection windows may include one or more slots or one or more subframes.

According to an embodiment, the transmitting UE may determine whether allocated resources preceding and/or following PSFCH resources in a time domain are included in a range satisfying a delay requirement related to sidelink information.

For example, if the range satisfying the delay requirement related to the sidelink information corresponds to A of FIG. 16, the transmitting UE may determine that first PSCCH and/or first PSSCH resources that precedes the PSFCH resources in a time domain are included in the range A that satisfies the delay requirement, and the transmitting UE may select or determine a first selection window including the first PSCCH and/or the first PSSCH resources. In addition, the transmitting UE may determine that second PSCCH and/or second PSSCH resources that follows the PSFCH resources in a time domain are included in the range A that satisfies the delay requirement, and the transmitting UE may select or determine a second selection window including the second PSCCH and/or the second PSSCH resources. In this case, for example, the transmitting UE may perform an initial transmission and a blind retransmission by using the first PSCCH and/or the first PSSCH resources included in the first selection window. For example, the transmitting UE may perform a SL HARQ feedback-based retransmission by using the second PSCCH and/or the second PSSCH resources included in the second selection window. The determination of the two selection windows by the transmitting UE in FIG. 16 is an example of the present disclosure, and the number of selection windows is not limited.

For example, if the range satisfying the delay requirement related to the sidelink information corresponds to B of FIG. 16, the transmitting UE may determine that resources related to transmission of the sidelink information preceding and/or following the PSFCH resource in the time domain are not included in the range B that satisfies the delay requirement. In this case, for example, the transmitting UE may perform an initial transmission and a HARQ feedback-based retransmission by using resources allocated within one or more selection windows. For example, after the transmitting UE performs the initial transmission by using first PSCCH and/or first PSSCH resources allocated within a first selection window, the transmitting UE may perform a HARQ feedback-based retransmission by using the second PSCCH and/or the second PSSSCH resources allocated within to second selection window.

Alternatively, for example, when the range satisfying the delay requirement related to the sidelink information corresponds to B of FIG. 16, the transmitting UE may not select a selection window. Accordingly, the transmitting UE may not transmit the sidelink information.

For example, if the range satisfying the delay requirement related to the sidelink information corresponds to C of FIG. 16, the transmitting UE may determine that first PSCCH and/or first PSSCH resources that precedes the PSFCH resources in a time domain are included in the range A that satisfies the delay requirement, and the transmitting UE may select or determine a first selection window including the first PSCCH and/or the first PSSCH resources. In addition, the transmitting UE may determine that resources related to transmission of the sidelink information following the PSFCH resource in the time domain are not included in the range C that satisfies the delay requirement. In this case, for example, the transmitting UE may perform an initial transmission and a blind retransmission by using the first PSCCH and/or the first PSSCH resources included in the first selection window.

According to an embodiment of the present disclosure, a time gap between a plurality of resources selected or determined by the transmitting UE (e.g., resources within a selection window or resources within a time domain) and PSFCH resources may include a minimum time gap. For example, a minimum time gap between an end of a last symbol of PSSCH transmission for the first resources and a beginning of a first symbol of PSFCH reception related to the PSSCH may be determined by a parameter for a resource pool. For example, the parameter for the resource pool may be configured for the UE by a higher layer. Alternatively, for example, the minimum time gap may include a time required for PSFCH reception and processing. For example, the PSFCH reception and processing may include multiplexing of physical channels, TX-RX switching, or RX-TX switching.

For example, referring to FIG. 16, a minimum time gap between the first PSCCH resources and/or the first PSSCH resources and the PSFCH resources within the first selection window may be a minimum time gap between an end of a last symbol for transmission related to the first PSSCH resources and a beginning of a first symbol for reception relate to the PSFCH resources. For example, the minimum time gap may be determined by a parameter for a resource pool. For example, the parameter for the resource pool may be configured for the UE by a higher layer. For example, the minimum time gap between the first PSCCH resources and/or the first PSSCH resources and the PSFCH resources within the first selection window may include a time required for reception and processing related to the PSFCH resources. For example, the reception and processing may include multiplexing of physical channels, TX-RX switching, or RX-TX switching.

According to various embodiments of the present disclosure, the transmitting UE may determine a selection window based on service requirements related to sidelink information, and the transmitting UE may efficiently transmit the sidelink information to the receiving UE according to whether HARQ feedback resources (e.g., a PSFCH resources) related to transmission of the sidelink information are included in the selection window. In addition, for example, according to relative positions in a time domain of the HARQ feedback resources (e.g., PSFCH resources) related to the transmission of sidelink information included in the selection window, the transmitting UE may efficiently transmit the sidelink information to the receiving UE.

Figure 17:
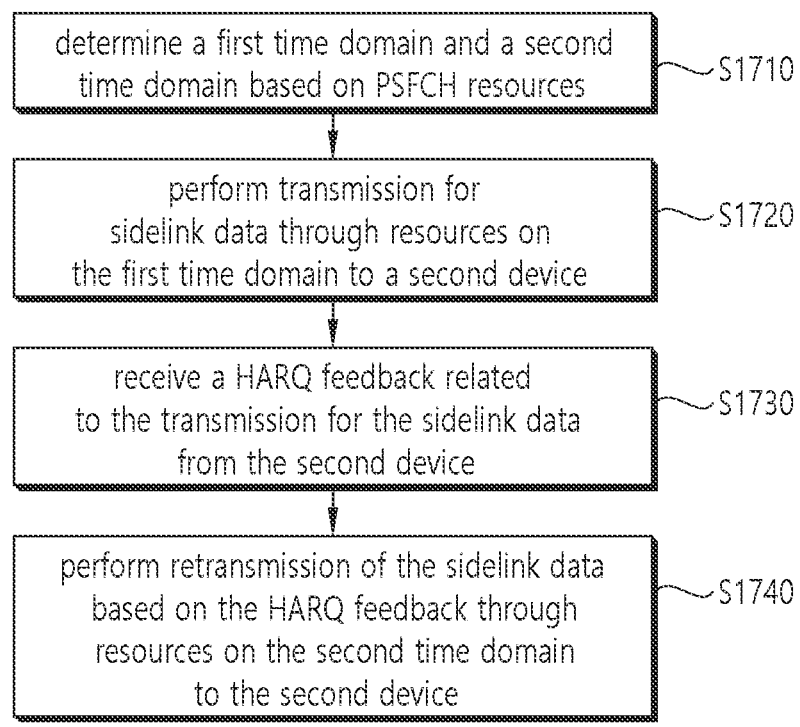
FIG. 17 shows a method for a first device to transmit sidelink data to a second device based on a first time domain and a second time domain in accordance with an embodiment of the present disclosure.

FIG. 17 shows a method for a first device to transmit sidelink data to a second device based on a first time domain and a second time domain in accordance with an embodiment of the present disclosure. The embodiment of FIG. 17 may be combined with various embodiments of the present disclosure.

Referring to FIG. 17, in step S1710, the first device 100 may determine a first time domain and a second time domain based on physical sidelink feedback channel (PSFCH) resources. For example, the first time domain may precede the PSFCH resources. For example, the second time domain may follow the PSFCH resources. For example, information for a time gap related to the PSFCH resources may be configured for the first device 100 based on downlink control information (DCI), a medium access control (MAC) control element (CE) or a radio resource control (RRC) signaling. For example, the first time domain and a time domain of the PSFCH resources may be spaced apart by a first time gap based on the information for the time gap related to the PSFCH resources. For example, the second time domain and a time domain of the PSFCH resources may be spaced apart by a second time gap based on the information for the time gap related to the PSFCH resources.

For example, a time interval of the first time domain and a time interval of the second time domain may be determined based on a delay requirement related to the sidelink data. For example, the delay requirement may be determined based on service requirements related to the sidelink data. For example, the delay requirement related to the sidelink data may include a time from when the first device 100 transmits the sidelink data to the second device 200 to a time when confirmation of transmission of the sidelink data is completed. For example, the time interval of the first time domain may be [n+T1, n+T2]. For example, the time interval of the second time domain may be [n+T3, n+T4]. For example, the T1, T2, T3 and T4 may be determined based on the information for the time gap and the delay requirement related to the sidelink data. For example, the n may be a value indicating a requested time point for the first device 100 to determine resources related to the sidelink data by a higher layer.

In step S1720, the first device 100 may perform transmission for sidelink data through resources on the first time domain to a second device 200. For example, the transmission for the sidelink data may include an initial transmission or a blind retransmission. For example, the first device 100 may perform an initial transmission or a blind retransmission of the sidelink data to the second device 200 through PSCCH and/or PSSCH resources in the first time domain.

In step S1730, the first device 100 may receive a hybrid automatic repeat request (HARQ) feedback related to the transmission for the sidelink data from the second device 200. For example, the first device 100 may receive a HARQ feedback related to transmission of the sidelink data from the second device 200 through the PSFCH resources.

In step S1740, the first device 100 may perform retransmission of the sidelink data based on the HARQ feedback through resources on the second time domain to the second device 200. For example, the first device 100 may perform a HARQ feedback to the second device 200 through PSCCH and/or PSSCH resources on the second time domain.

For example, the first device 100 may perform at least one of an initial transmission, a blind retransmission, or a HARQ feedback-based retransmission based on the first time domain and the second time domain being included within a range that satisfies a delay requirement related to the sidelink data. For example, the first device 100 may retransmit the sidelink data to the second device 200 based on an interference level related to the resources on the second time domain that is less than or equal to a pre-configured threshold value. For example, the first device 100 may retransmit the sidelink data to the second device 200 based on allowing a high delay for the sidelink data. For example, the first device 100 may perform retransmission of the sidelink data based on a cast type related to the sidelink data being unicast or groupcast.

For example, the first device 100 may release the resources on the second time domain based on the HARQ feedback related to the transmission of the sidelink data being a HARQ-ACK. For example, the first device 100 may omit the retransmission based on the HARQ feedback related to the transmission of the sidelink data being a HARQ-ACK. For example, the first device 100 may perform the retransmission for the sidelink data based on the HARQ feedback related to the transmission for the sidelink data being HARQ-NACK.

The above-described embodiment may be applied to various devices to be described below. First, for example, the processor 102 of the first device 100 may determine a first time domain and a second time domain based on physical sidelink feedback channel (PSFCH) resources. And, for example, the processor 102 of the first device 100 may control the transceiver 106 to perform transmission for sidelink data through resources on the first time domain to a second device 200. And, for example, the processor 102 of the first device 100 may control the transceiver 106 to receive a hybrid automatic repeat request (HARQ) feedback related to the transmission for the sidelink data from the second device 200. And, for example, the processor 102 of the first device 100 may control the transceiver 106 to perform retransmission of the sidelink data based on the HARQ feedback through resources on the second time domain to the second device 200.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine a first time domain and a second time domain based on physical sidelink feedback channel (PSFCH) resources, perform, to a second device, transmission for sidelink data through resources on the first time domain, receive, from the second device, a hybrid automatic repeat request (HARQ) feedback related to the transmission for the sidelink data, and perform, to the second device, retransmission of the sidelink data based on the HARQ feedback through resources on the second time domain. For example, the first time domain precedes the PSFCH resources. For example, the second time domain follows the PSFCH resources.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: determine a first time domain and a second time domain based on physical sidelink feedback channel (PSFCH) resources, perform, to a second UE, transmission for sidelink data through resources on the first time domain, receive, from the second UE, a hybrid automatic repeat request (HARQ) feedback related to the transmission for the sidelink data, and perform, to the second UE, retransmission of the sidelink data based on the HARQ feedback through resources on the second time domain. For example, the first time domain precedes the PSFCH resources. For example, the second time domain follows the PSFCH resources.

According to an embodiment of the present disclosure, a non-transitory computer-readable storage medium storing instructions may be provided. For example, the instructions, when executed, cause a first device to: determine a first time domain and a second time domain based on physical sidelink feedback channel (PSFCH) resources, perform, to a second device, transmission for sidelink data through resources on the first time domain, receive, from the second device, a hybrid automatic repeat request (HARQ) feedback related to the transmission for the sidelink data, and perform, to the second device, retransmission of the sidelink data based on the HARQ feedback through resources on the second time domain. For example, the first time domain precedes the PSFCH resources. For example, the second time domain follows the PSFCH resources.

Figure 18:
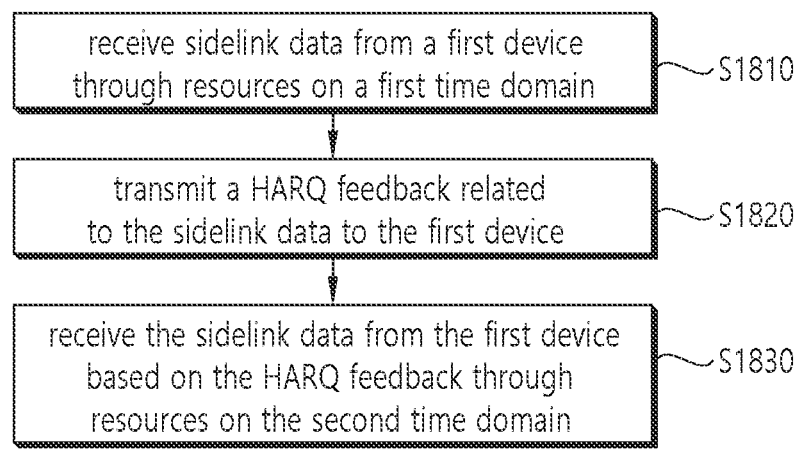
FIG. 18 shows a method for a second device to receive sidelink data from a first device based on a first time domain and a second time domain, in accordance with an embodiment of the present disclosure.

FIG. 18 shows a method for a second device to receive sidelink data from a first device based on a first time domain and a second time domain, in accordance with an embodiment of the present disclosure. The embodiment of FIG. 18 may be combined with various embodiments of the present disclosure.

Referring to FIG. 18, in step S1810, the second device may receive sidelink data from a first device 100 through resources on a first time domain. For example, the second device 200 may receive sidelink data from the first device 100 through PSCCH and/or PSSCH resources in a first time domain. For example, the first time domain and the second time domain may be determined based on PSFCH resources. For example, the first time domain may precede the PSFCH resources. For example, the second time domain may follow the PSFCH resources. For example, information for a time gap related to the PSFCH resources may be configured for the first device 100 or the second device 200 based on a medium access control (MAC) control element (CE) or a radio resource control (RRC) signaling. For example, the first time domain and a time domain of the PSFCH resources may be spaced apart by a first time gap based on the information for the time gap related to the PSFCH resources. For example, the second time domain and a time domain of the PSFCH resources may be spaced apart by a second time gap based on the information for the time gap related to the PSFCH resources.

For example, a time interval of the first time domain and a time interval of the second time domain may be determined based on a delay requirement related to the sidelink data. For example, the delay requirement may be determined based on service requirements related to the sidelink data. For example, the delay requirement related to the sidelink data may include a time from when the first device 100 transmits the sidelink data to the second device 200 to a time when confirmation of transmission of the sidelink data is completed. For example, the time interval of the first time domain may be [n+T1, n+T2]. For example, the time interval of the second time domain may be [n+T3, n+T4]. For example, the T1, T2, T3 and T4 may be determined based on the information for the time gap and the delay requirement related to the sidelink data. For example, the n may be a value indicating a requested time point for the first device 100 or the second device 200 to determine resources related to the sidelink data by a higher layer.

In step S1820, the second device 200 may transmit a HARQ feedback related to the sidelink data to the first device 100. For example, the second device 200 may transmit a HARQ feedback related to the sidelink data from the first device 100 through the PSFCH resources. For example, the HARQ feedback may include HARQ-ACK or HARQ-NACK.

In step S1830, the second device 200 may receive the sidelink data from the first device 100 based on the HARQ feedback through resources on the second time domain. For example, the second device 200 may receive the sidelink data from the first device 100 based on the HARQ feedback through PSCCH and/or PSSCH resources on the second time domain.

For example, based on the first time domain and the second time domain being included within a range that satisfies a delay requirement related to the sidelink data, the second device 200 may receive the sidelink data. For example, based on an interference level related to resources in the second time domain being less than or equal to a pre-configured threshold, the second device 200 may transmit a HARQ feedback related to the sidelink data to the first device 100. For example, based on allowing a high delay for sidelink data, the second device 200 may transmit a HARQ feedback related to the sidelink data to the first device 100. For example, based on a cast type related to the sidelink data being unicast or groupcast, the second device 200 may transmit a HARQ feedback related to the sidelink data.

The above-described embodiment may be applied to various devices to be described below. First, for example, the processor 202 of the second device 200 may control the transceiver 206 to receive sidelink data from a first device 100 through resources on a first time domain. And, for example, the processor 202 of the second device 200 may control the transceiver 206 to transmit a HARQ feedback related to the sidelink data to the first device 100. And, for example, the processor 202 of the second device 200 may control the transceiver 206 to receive the sidelink data from the first device 100 based on the HARQ feedback through resources on the second time domain.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, sidelink data from a first device through resources on a first time domain, transmit, to the first device, a hybrid automatic repeat request (HARQ) feedback related to the sidelink data, and receive, from the first device, the sidelink data based on the HARQ feedback through resources on a second time domain. For example, the first time domain and the second time domain are determined based on physical sidelink feedback channel (PSFCH) resources. For example, the first time domain precedes the PSFCH resources. For example, the second time domain follows the PSFCH resources.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
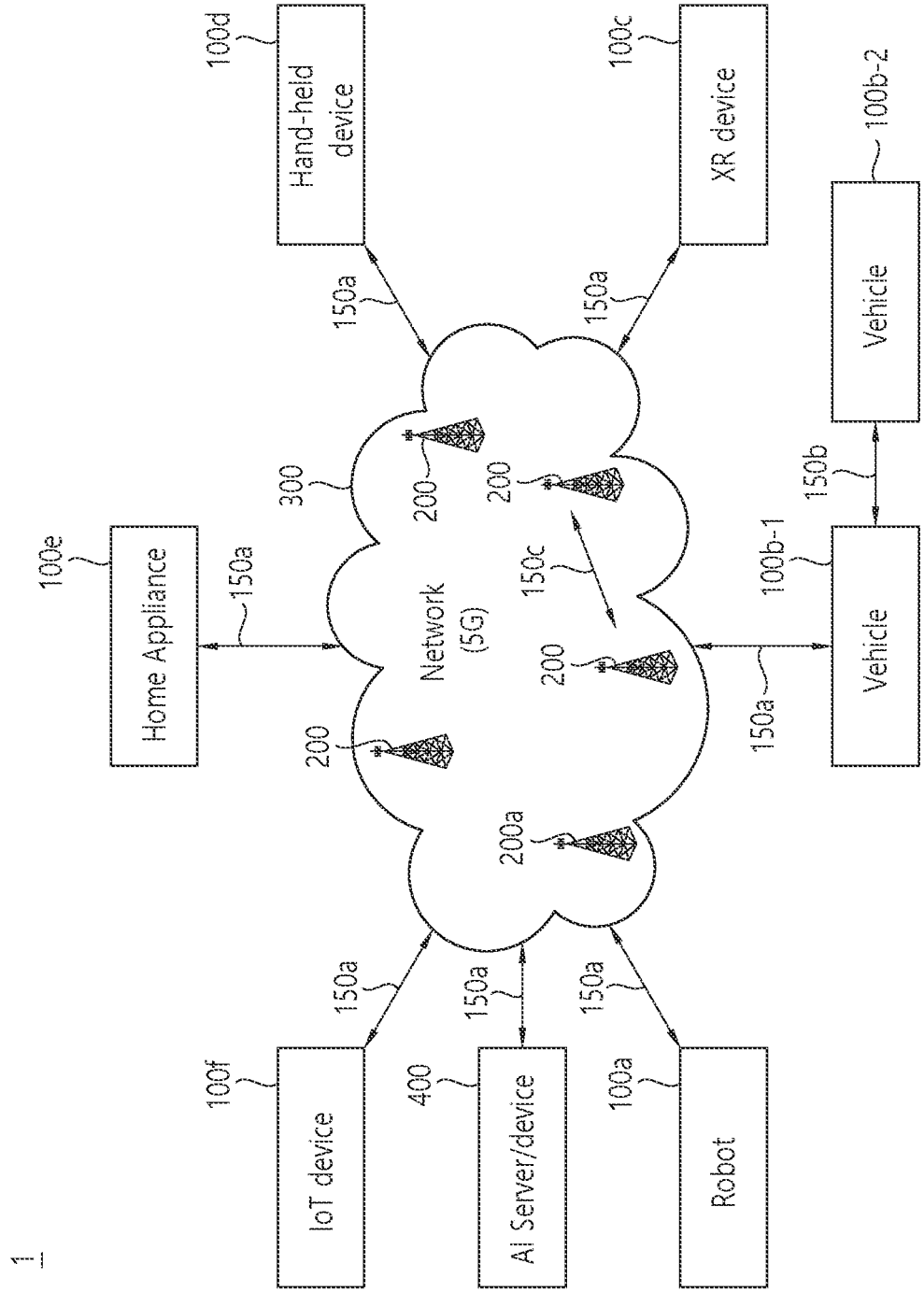
FIG. 19 shows a communication system 1, in accordance with an embodiment of the present disclosure.

FIG. 19 shows a communication system 1, in accordance with an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul(IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
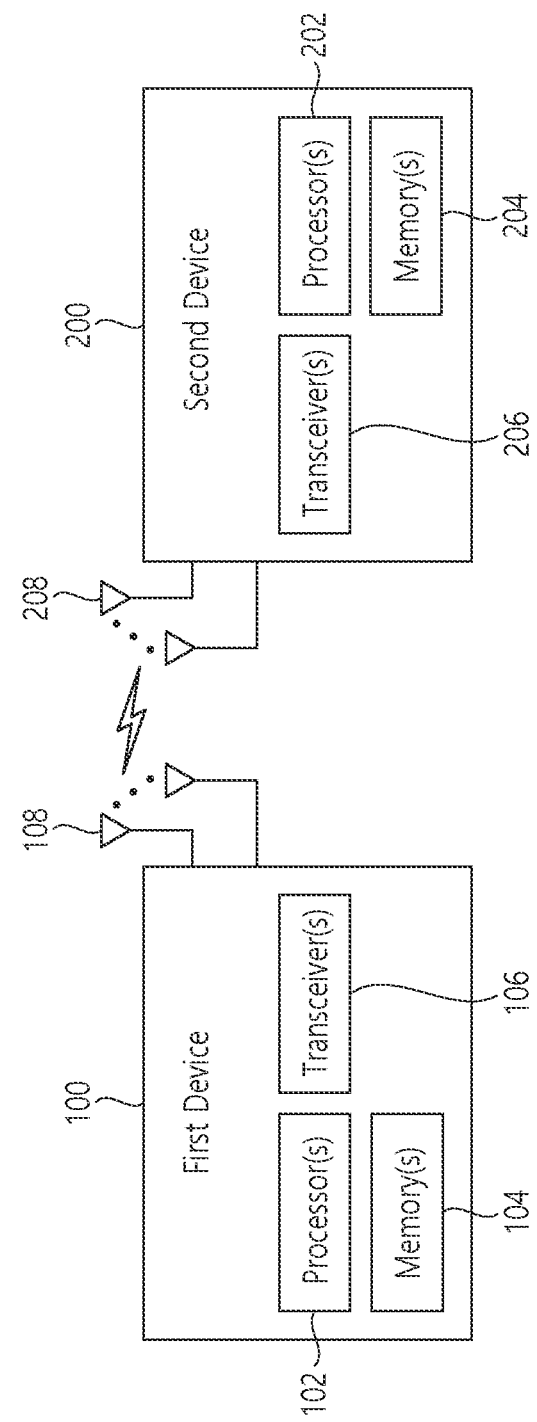
FIG. 20 shows wireless devices, in accordance with an embodiment of the present disclosure.

FIG. 20 shows wireless devices, in accordance with an embodiment of the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
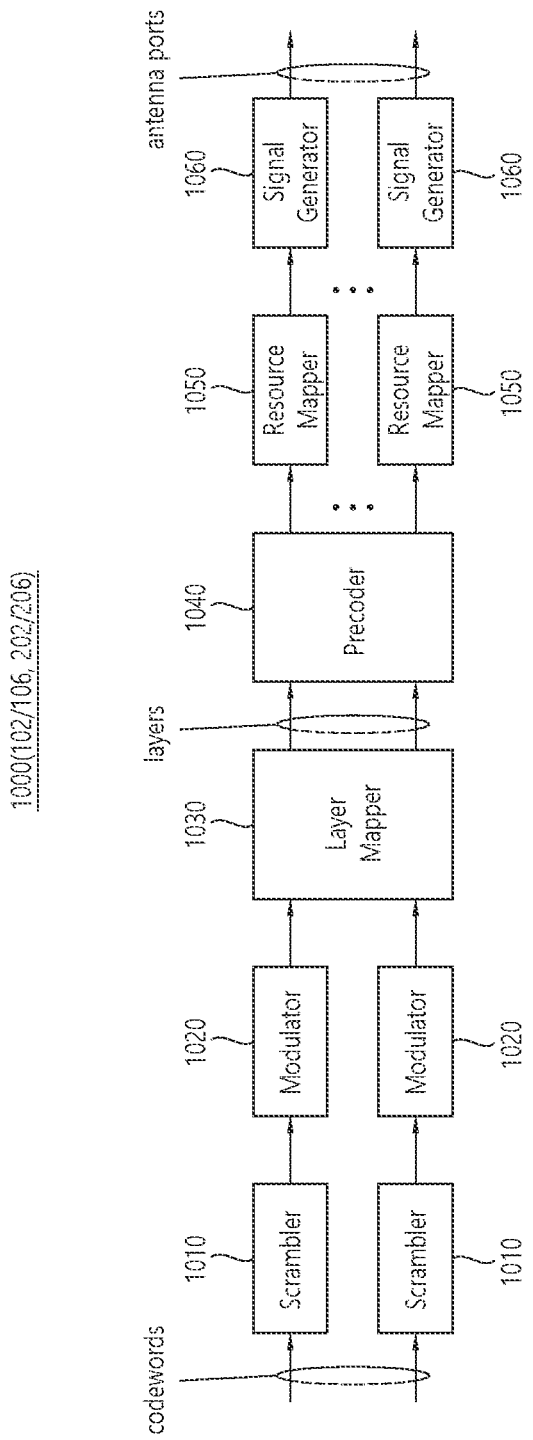
FIG. 21 shows a signal process circuit for a transmission signal, in accordance with an embodiment of the present disclosure.

FIG. 21 shows a signal process circuit for a transmission signal, in accordance with an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
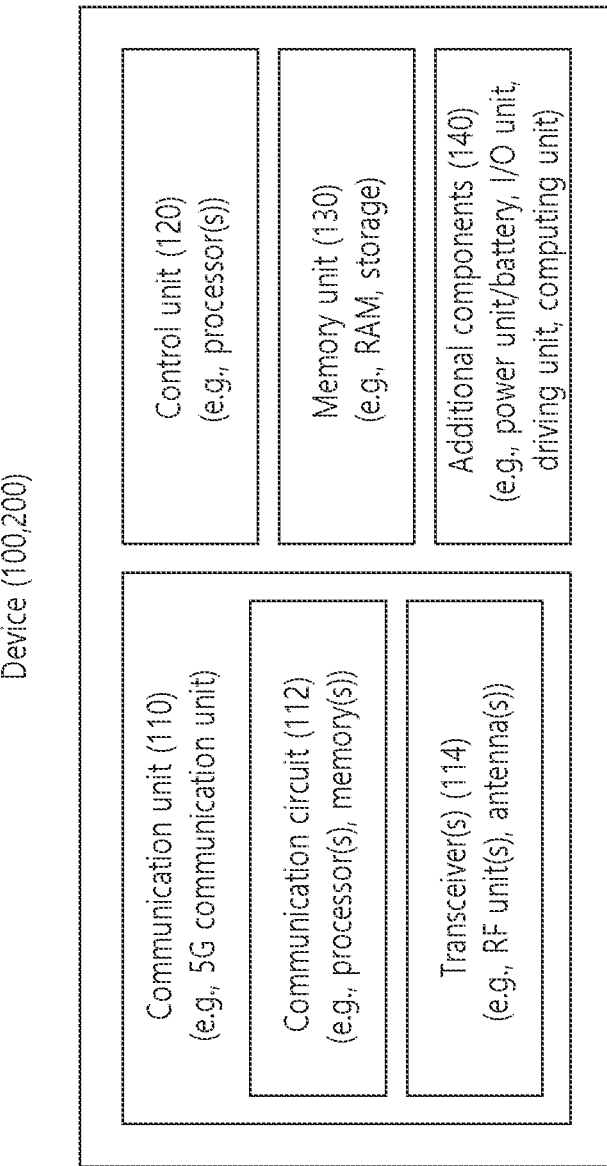
FIG. 22 shows a wireless device, in accordance with an embodiment of the present disclosure.

FIG. 22 shows another example of a wireless device, in accordance with an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
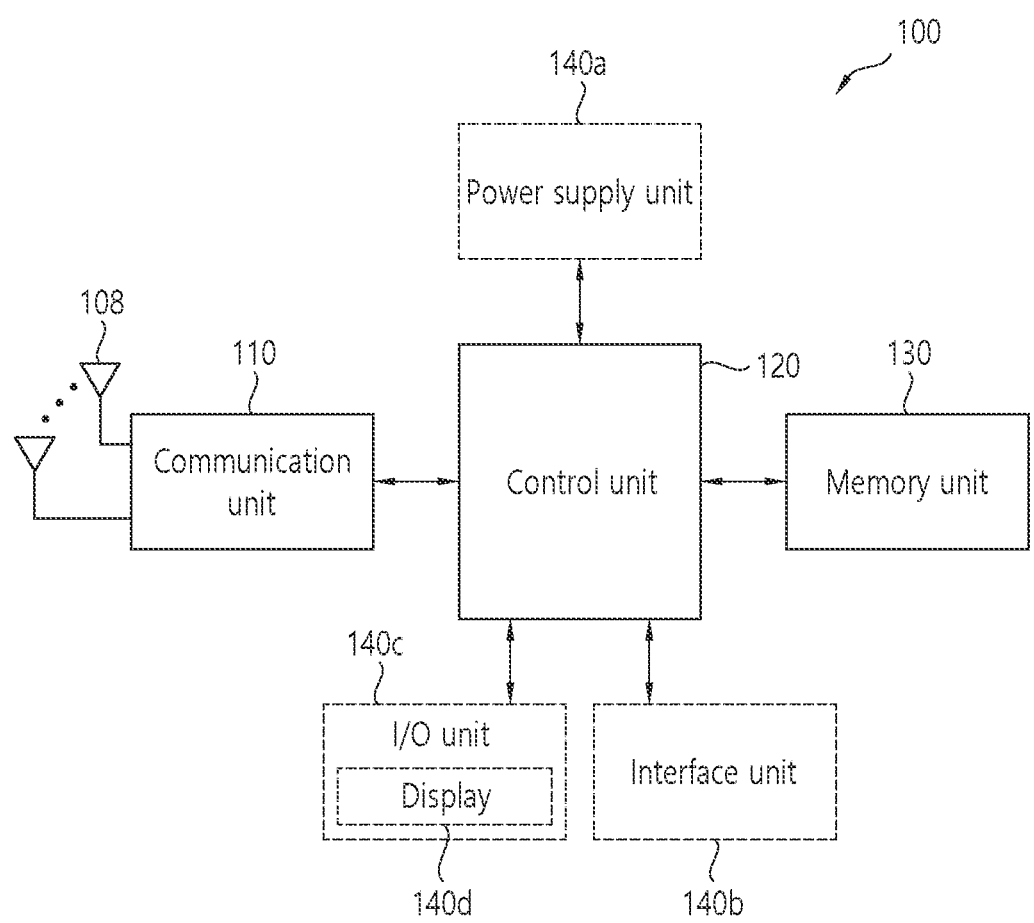
FIG. 23 shows a hand-held device, in accordance with an embodiment of the present disclosure.

FIG. 23 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 24:
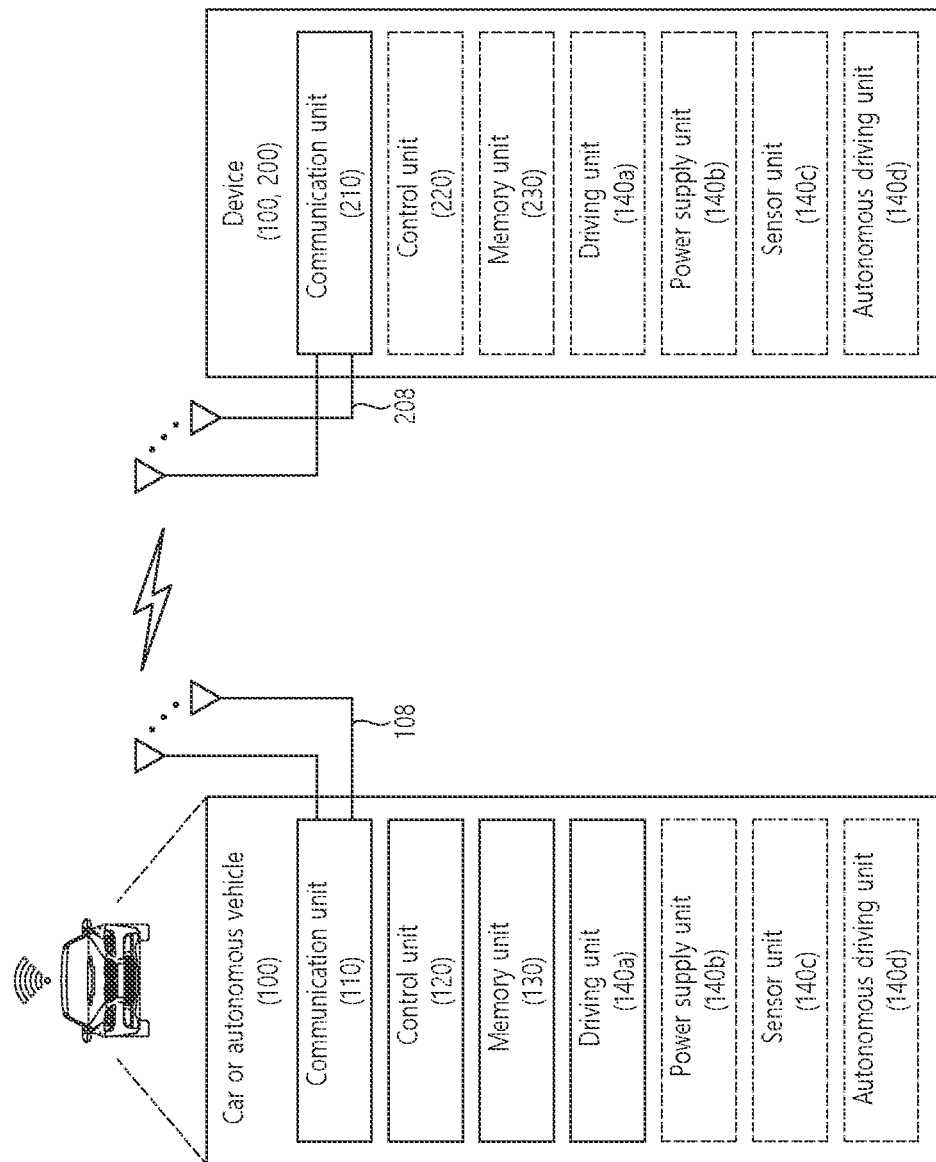
FIG. 24 shows a car or an autonomous vehicle, in accordance with an embodiment of the present disclosure.

FIG. 24 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    performing, to a second device, transmission for sidelink data through resources on a first time domain;
    receiving, from the second device, a hybrid automatic repeat request (HARQ) feedback related to the transmission for the sidelink data; and
    performing, to the second device, retransmission of the sidelink data based on the HARQ feedback through resources on a second time domain,
    wherein the first time domain precedes physical sidelink feedback channel (PSFCH) resources,
    wherein the second time domain follows the PSFCH resources,
    wherein the first time domain and a time domain of the PSFCH resources are spaced apart by a first time gap based on information for a time gap related to the PSFCH resources, and
    wherein the information for the time gap related to the PSFCH resources is configured based on a radio resource control (RRC) signaling.

2. The method of claim 1, wherein the transmission for the sidelink data includes an initial transmission or a blind retransmission.

3. The method of claim 2, wherein the second time domain and a time domain of the PSFCH resources are spaced apart by a second time gap based on the information for the time gap related to the PSFCH resources.

4. The method of claim 2, wherein a time interval of the first time domain and a time interval of the second time domain are determined based on a delay requirement related to the sidelink data, and
    wherein the delay requirement is determined based on service requirements related to the sidelink data.

5. The method of claim 4, wherein the delay requirement related to the sidelink data includes a time from when the first device transmits the sidelink data to the second device to a time when confirmation of transmission of the sidelink data is completed.

6. The method of claim 5, wherein the time interval of the first time domain is [n+T1, n+T2],
    wherein the time interval of the second time domain is [n+T3, n+T4], and
    wherein the T1, T2, T3 and T4 are determined based on the information for the time gap and the delay requirement related to the sidelink data.

7. The method of claim 6, wherein the n is a value indicating a requested time point for the first device to determine resources related to the sidelink data by a higher layer.

8. The method of claim 1, wherein at least one of an initial transmission, a blind retransmission, or a HARQ feedback-based retransmission is performed based on the first time domain and the second time domain being included within a range that satisfies a delay requirement related to the sidelink data.

9. The method of claim 1, wherein the retransmission is performed based on allowing a high delay for the sidelink data.

10. The method of claim 1, wherein the resources on the second time domain are released based on the HARQ feedback related to the transmission of the sidelink data being a HARQ-ACK, and
    wherein the retransmission is omitted.

11. The method of claim 1, wherein the retransmission is performed based on the HARQ feedback related to the transmission for the sidelink data being HARQ-NACK.

12. The method of claim 1, wherein the retransmission is performed based on a cast type related to the sidelink data being unicast or groupcast.

13. A first device for performing wireless communication, the first device comprising:
    one or more memories storing instructions;
    one or more transceivers; and
    one or more processors connected to the one or more memories and the one or more transceivers, wherein the one or more processors execute the instructions to:
    perform, to a second device, transmission for sidelink data through resources on a first time domain;

receive, from the second device, a hybrid automatic repeat request (HARQ) feedback related to the transmission for the sidelink data; and perform, to the second device, retransmission of the sidelink data based on the HARQ feedback through resources on a second time domain, wherein the first time domain precedes physical sidelink feedback channel (PSFCH) resources, wherein the second time domain follows the PSFCH resources, wherein the first time domain and a time domain of the PSFCH resources are spaced apart by a first time gap based on information for a time gap related to the PSFCH resources, and wherein the information for the time gap related to the PSFCH resources is configured based on a radio resource control (RRC) signaling.

14. A device configured to control a first user equipment (UE), the device comprising:

one or more processors; and one or more memories being operably connectable to the one or more processors and storing instructions, wherein the one or more processors execute the instructions to:

perform, to a second UE, transmission for sidelink data through resources on a first time domain;

receive, from the second UE, a hybrid automatic repeat request (HARQ) feedback related to the transmission for the sidelink data; and perform, to the second UE, retransmission of the sidelink data based on the HARQ feedback through resources on a second time domain, wherein the first time domain precedes physical sidelink feedback channel (PSFCH) resources, wherein the second time domain follows the PSFCH resources, wherein the first time domain and a time domain of the PSFCH resources are spaced apart by a first time gap based on information for a time gap related to the PSFCH resources, and wherein the information for the time gap related to the PSFCH resources is configured based on a radio resource control (RRC) signaling.

* * * * *